United States Patent [19]

Saini

[11] Patent Number: 4,949,291
[45] Date of Patent: Aug. 14, 1990

[54] APPARATUS AND METHOD FOR CONVERTING FLOATING POINT DATA FORMATS IN A MICROPROCESSOR

[75] Inventor: Avtar Saini, San Jose, Calif.

[73] Assignee: Intel Corporation, Santa Clara, Calif.

[21] Appl. No.: 288,433

[22] Filed: Dec. 22, 1988

[51] Int. Cl.$^5$ .............................................. G06F 7/38
[52] U.S. Cl. ................................................ 364/715.03
[58] Field of Search ......................... 364/715.03, 748; 341/88, 106

[56] References Cited

U.S. PATENT DOCUMENTS

| | | | |
|---|---|---|---|
| 3,872,442 | 3/1975 | Boles et al. | 364/715.03 |
| 4,701,746 | 10/1987 | Veda et al. | 341/106 |
| 4,831,575 | 5/1989 | Kuroda | 364/715.03 |

OTHER PUBLICATIONS

Murray, "Mapping to Symmetrically Extend the Exponent Range of Floating-Point Arithmetic" *IBM Tech. Disclosure Bulletin* vol. 17, No. 1, Jun. 1974 pp. 1-4 364/748.

"80387 Programmer's Reference Manual"; Intel Corporation; 1987; Chapters 1, 2, 3, Appendix E, & Table of Contents.

*Primary Examiner*—David H. Malzahn
*Attorney, Agent, or Firm*—Blakely, Sokoloff, Taylor & Zafman

[57] ABSTRACT

An apparatus and method for converting the format of the exponent portion of a biased floating point number in a microprocessor is disclosed. The present invention allows a conversion to be performed as the data is being loaded. Decoding circuitry first determines when floating point data is about to be loaded. A constant, which corresponds to the type of conversion to be performed, is then generated from a ROM. The data and constant are added and the result, representing the converted exponent is stored in an exponent resister within one clock period.

13 Claims, 5 Drawing Sheets

FIG_1

IEEE FORMATS FOR FLOATING POINT NUMBERS

S - SIGN
E - BIASED EXPONENT
F - FRACTION
J - JBIT IMAGINARY 1 OF 1.FRACTION
I - SIGN OF INTEGER
GRS - GUARD, ROUND, AND STICKY BITS

FIG—4

FIG_5

APPARATUS AND METHOD FOR CONVERTING FLOATING POINT DATA FORMATS IN A MICROPROCESSOR

FIELD OF THE INVENTION

This invention relates to the field of semiconductor microprocessors, and particularly to the way in which floating point data represented in one kind of format is converted to another kind of format.

BACKGROUND OF THE INVENTION

The present invention covers a conversion unit forming part of a microprocessor that is an improved version of the Intel80386 microprocessor, frequently referred to as the 386 processor. In many applications, the 386 processor provides floating point data for the 80387 math co-processor, also frequently referred to as the 387 co-processor. The 387 processor includes a floating point execution unit which handles floating point arithmetic operations. Details of the floating point execution unit of the 387 are described in numerous publications (Intel 80386, 386, 80387, and 387 are trademarks of Intel Corporation).

It is well-known in the art that floating point data can have many different representations. Commonly, a user conforming to IEEE standard formats will provide data to a microprocessor in single precision real, double precision real, or extended precision real formats. Because of the difficulty in performing mixed format arithmetic operations (e.g., multiplication of a single precision real number by a double precision real number), many microprocessors convert floating point data to a predetermined standard format before beginning any operation. For instance, the 387 co-processor performs its floating point operations using a special internal format (the significance of the internal format will be explained in detail later). Therefore, it is necessary to convert all floating point data to the internal format of the 387 before performing any operations. After all arithmetic operations have been completed, the result can be converted back to any desired format of the user.

Although various circuits and schemes exist for converting floating point data formats within a microprocessor, they are typically time consuming, and therefore costly in terms of overall system performance. In the 387 co-processor, for example, the conversion step uses a finite state machine called a nanosequencer and requires two full clock pulses to complete.

Because floating point data operations are themselves very time consuming and, for scientific applications, comprise about 25–30% of all opertions within a microprocessor, it is desirable to have circuitry that could convert the data to the required format much faster. Thus, what is needed is a new approach that detects when floating point data is about to be loaded and then converts that data to the required format prior to the storage of the data in a register.

Figure 2:
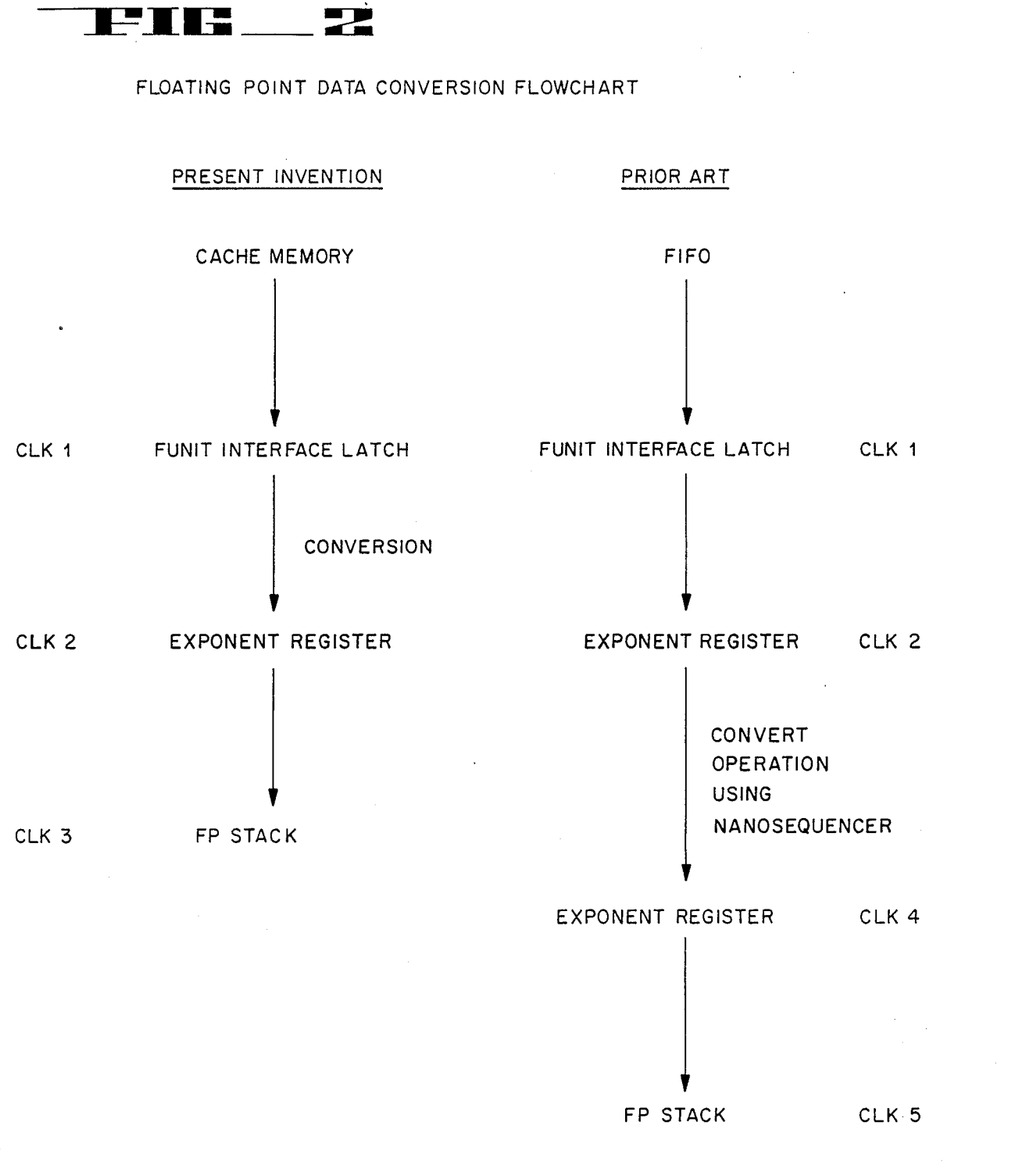
FIG. 2 is a conversion flowchart comparing floating point data conversion of the present invention against that of the prior art.

FIG. 2 illustrates the difference between the conversion process of the 387 co-processor (representing the prior art) and the present invention. In the prior art, floating point data initially resides in a FIFO (first-in-first-out) memory unit which corresponds to the cache memory in the present invention. When a microcode instruction calling for the loading of a floating point number is received by the floating point execution unit (commonly referred to as the "Funit"), the number is latched into the Funit interface latch in response to CLK1. The exponent portion of that number is then separated from its mantissa and stored in an exponent register. This occurs at CLK2. Afterwards, a convert operation, which requires two clock pulses to complete, is initiated. The conversion is performed using a nanosequencer. Upon the transmission of CLK4, the converted exponent is transferred back to the exponent register. Finally, clock pulse CLK5 sends the converted exponent to the floating point stack (FP Stack) where it is available for arithmetic operations (i.e., addition, subtraction, multiplication, etc.).

In contrast, the present invention is capable of performing a format conversion as the number is being loaded from the Funit interface latch to the exponent register. Consequently, the converted floating point number is presented to the FP stack at CLK3 instead of at CLK5 as shown in the flowchart of FIG. 2. By eliminating the two clock pulses normally required for the convert operation, a 40% increase in floating point processing speed is realized. Such an increase is significant in the overall performance of a microprocessor system.

As will be seen, the present invention permits conversion to be performed as described above, i.e., "on the fly". This capability enhances the presently described microprocessor when compared to prior art processors.

SUMMARY OF THE INVENTION

A data format conversion apparatus for converting biased floating point data formats in a microprocessor is described. The microprocessor provides a two-phase clocking means for synchronizing the conversion process. A decoding means decodes a continuous stream of microcode instructions, providing a first signal when a conversion instruction is received. The first signal is sent to a constant generating circuit which provides a certain constant in response to the first signal. The constant is selected from a plurality of stored constants based both on the format of the floating point number to be converted, and the resultant format which is desired.

The floating point number which is to be converted is latched along with the certain constant to the inputs of an adder, which adds the certain constant to the floating point number to produce a result which is the floating point number in a second kind of format. The result is stored in a register where it is then made available to the floating point stack.

One of the advantages of the present invention over prior art circuits is that conversion of floating point data can occur "on the fly"—that is, as the floating point data is being loaded into the microprocessor's floating point execution unit. Other aspects of the present invention are described in the detailed description of the invention.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE INVENTION

A conversion apparatus for converting the exponent portion of a floating point number from one format to another is described. In the following description, numerous specific details are set forth, such as specific number of bits, etc., in order to provide a thorough understanding of the present invention. It will be obvious, however, to one skilled in the art that the present invention may be practiced without these specific details. In other instances, well-known circuits have not been shown in detail in order not to unnecessarily obscure the present invention.

Figure 1:
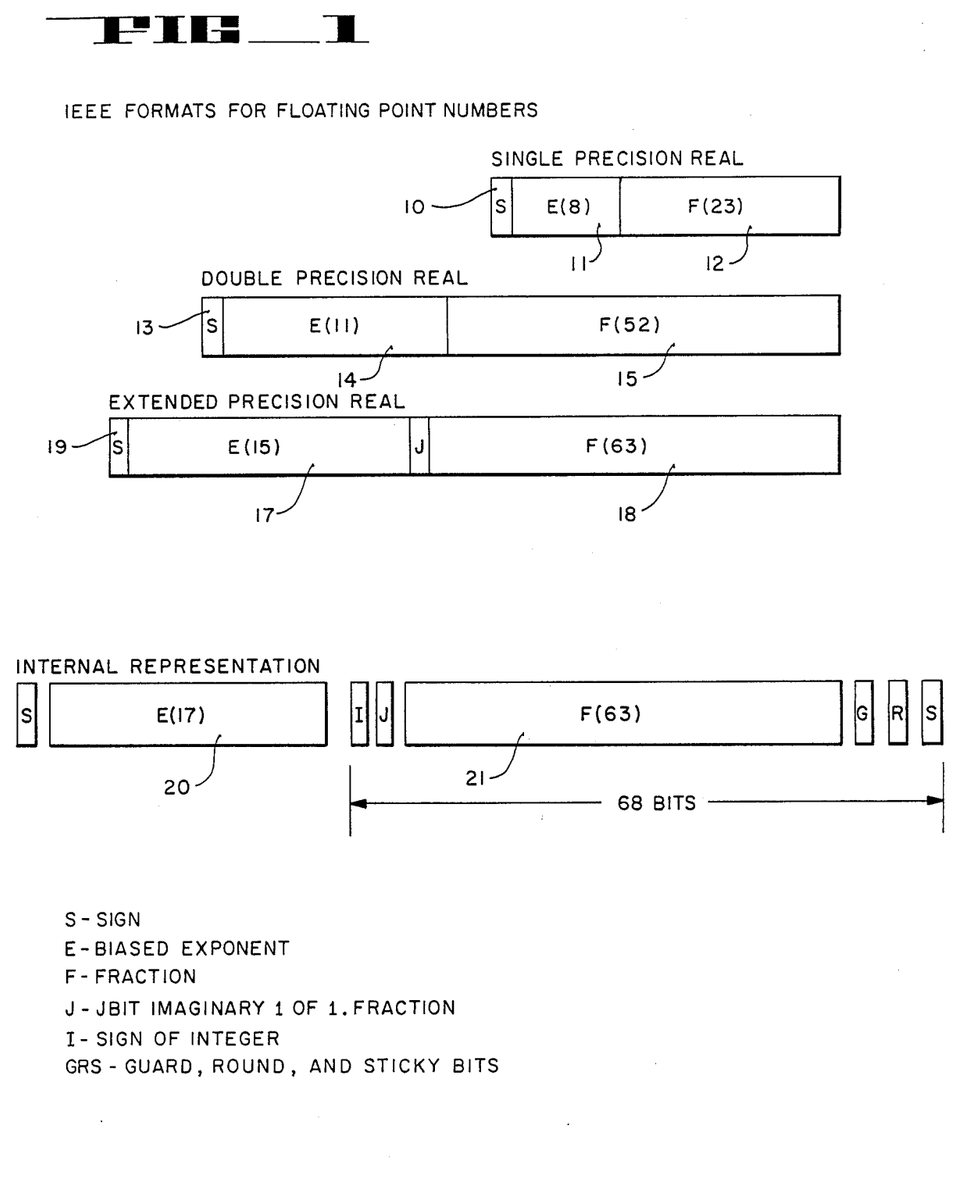
FIG. 1 illustrates the IEEE formats for floating point numbers having single, double and extended precision real formats. The internal representation for the processor of a preferred embodiment is also shown.

Floating point numbers are capable of representing a wide range of values—from very large numbers to very small numbers, while maintaining the same precision throughout. Although a variety of data types are possible, floating point numbers usually assume one of the standard IEEE formats shown in FIG. 1. For example, FIG. 1 shows a single precision real number having a signed bit 10, an exponent portion 11, which is 8-bits long, and a mantissa or fraction portion 12, which is 23-bits long. Similarly, the double precision real representation has a sign bit 13, an 11-bit long exponent portion 14 and a fraction portion 15, which is 52-bits long. The extended precision real format has a 15-bit long exponent portion 17, a 64-bit fraction portion 18 (which includes a single J-bit) and a sign bit 19.

In performing arithmetic operations such as addition, subtraction, multiplication and division, the exponent portion and the fraction portion are usually separated. Conversion of the fraction portion is relatively straight forward, because the fraction is expanded by simply adding zeros to the extra bit positions to the right most portion of the number. For example, to convert the fraction portion of a single precision real number to a double precision real format, a string of 29 consecutive zeros is added to the end of the fraction (52 bits—23 bits=29 bits). Converting the exponent is a more involved operation, as will be explained later.

FIG. 1 also shows an internal representation for the microprocessor of the currently preferred embodiment. The internal representation has a fraction portion 21, which is 63-bits long, and an exponent portion 20 which is 17-bits long. (The internal representation includes a number of other bits such as the I, Guard, Round and Sticky bits which are not relevant to the discussion of the present invention.). By using an internal representation which is larger than any of the data formats the microprocessor can accommodate, overflow and rounding errors which normally occur during arithmetic operations are virtually eliminated. A preferred embodiment of the present invention is capable of performing a conversion from any of the IEEE formats to the internal representation given in FIG. 1 and from internal to extended precision real format.

To convert a biased floating point number having one kind of format to the same biased floating point number in a second kind of format, the present invention adds a certain predetermined constant to the exponent portion of the number. The value of this constant is selected to represent the difference between the bias points of th first and second kind of floating point formats.

Figure 3:
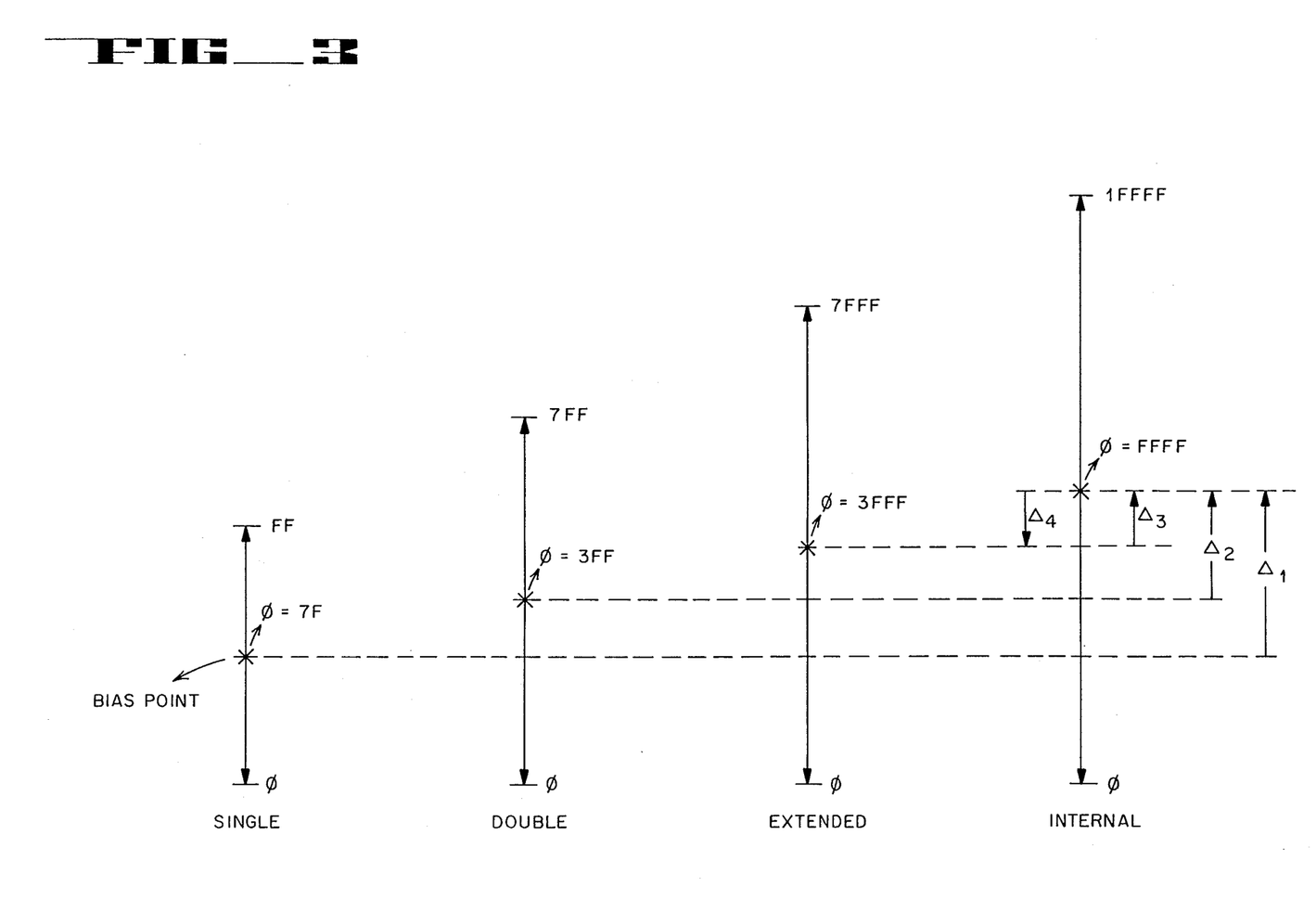
FIG. 3 illustrates the range and bias points for the floating point data formats of FIG. 1. Also shown is the shift in bias level required for a conversion from one format to another.

Referring to FIG. 3, the range and bias points of single, double, extended and internal representations are shown. According to FIG. 3, a single precision real number can have a value which ranges anywhere between 0 and hexidecimal number FF, i.e., all 8-bits of the exponent equal to one (hexidecimal number FF is equivalent to the binary number 1111 1111). The bias point for each format is located mid-way between the maximum and minimum values. For example, in the single precision real representation, the bias point is hexidecimal number 7F (0111 1111 in binary). For double precision numbers, the bias point is 3FF (=0011 1111 1111), and so on.

Table 1, shown below, lists by way of example the correspondence between variouus single precision numbers and their equivalent biased representations.

TABLE 1

| Single Precision Representation | Equivalent Biased Representation |
| --- | --- |
| $1.F \times 2^0$ | $1.F \times 2^{7F}$ |
| $1.F \times 2^1$ | $1.F \times 2^{80}$ |
| $1.F \times 2^{-1}$ | $1.F \times 2^{7E}$ |

For instance, the bias point 7F corresponds to an exponent of zero. All values above the bias point of 7F correspond to positive exponents and all exponent values below 7F correspond to negative exponents. Thus, the biased number $1.0 \times 2^{80}$ corresponds to the single precision real number $1.0 \times 2^1$ while $1.0 \times 2^{7E}$ corresponds to $1.0 \times 2^{-1}$.

Because each of the floating point formats of FIG. 1 have different exponent bit lengths, the bias point for each of the representations appears at a different point. For double precision real representation, the biased value is 3FF. For extended real, the biased value is 3FFF. For internal representation, the bias level is FFFF. To convert a number to a different format, the present invention adds a constant—corresponding to the difference in bias points between the first and second formats—to the exponent. For instance, to convert a single precision real number to internal representation the number would be shifted upward by the amount $\Delta_1$, shown in FIG. 3. In the same manner, conversion from double precision real to internal requires a shift of $\Delta_2$. Conversion from extended real to internal requires a shift of $\Delta_3$. Conversion from internal to extended requires a shift downward of $\Delta_4$. Table 2, below, gives for each type of conversion the logical operation that is to be performed. Each of the data format types are shown with their associated bias points.

TABLE 2

| Data Format To Be Converted | | Data Format To Convert To | | Logical | Constant |
| --- | --- | --- | --- | --- | --- |
| Type | Bias | Type | Bias | Operation | Stored in ROM |
| Single Real | 7F | Internal | FFFF | Exponent − 7F + FFFF | Exponent + FF80 = $\Delta_1$ |
| Double Real | 3FF | Internal | FFFF | Exponent − 3FF + FFFF | Exponent + FC00 = $\Delta_2$ |

TABLE 2-continued

| Data Format To Be Converted | | Data Format To Convert To | | Logical | Constant |
| --- | --- | --- | --- | --- | --- |
| Type | Bias | Type | Bias | Operation | Stored in ROM |
| Extended Real | 3FFF | Internal | FFFF | Exponent − 3FFF + FFFF | Exponent + C000 = $\Delta_3$ |
| Internal | FFFF | Extended | 3FFF | Exponent − FFFF + 3FFF | Exponent + 14000 = $\Delta_4$ |

As previously mentioned, a mathematical operation must be performed to convert the data having a first format to a second format. Logically, the bias point of the first format is subtracted from the exponent to be converted. Next, the bias value of the second data format (the one to be converted to) is added to the result of the previous subtraction.

Consider as an example the conversion of the single real number $2^{80}$ (equivalent to the biased representation $2^1$) to internal format. The bias value of the single precision real representation is first subtracted from hexidecimal number 80, producing an intermediate result of 1. The internal representation bias value of FFF is then added to the intermediate result to give the final result of 10000 (hexidecimal) which corresponds to the biased internal number $2^1$. The logical operations of subtracting 7F and adding FFFF are combined to form the constant $\Delta_1$ = FF80 (= FFFF − 7F). Table 2 gives each of the constants associated with a particular conversion. These constants are stored in a ROM until needed for a conversion.

Figure 5:
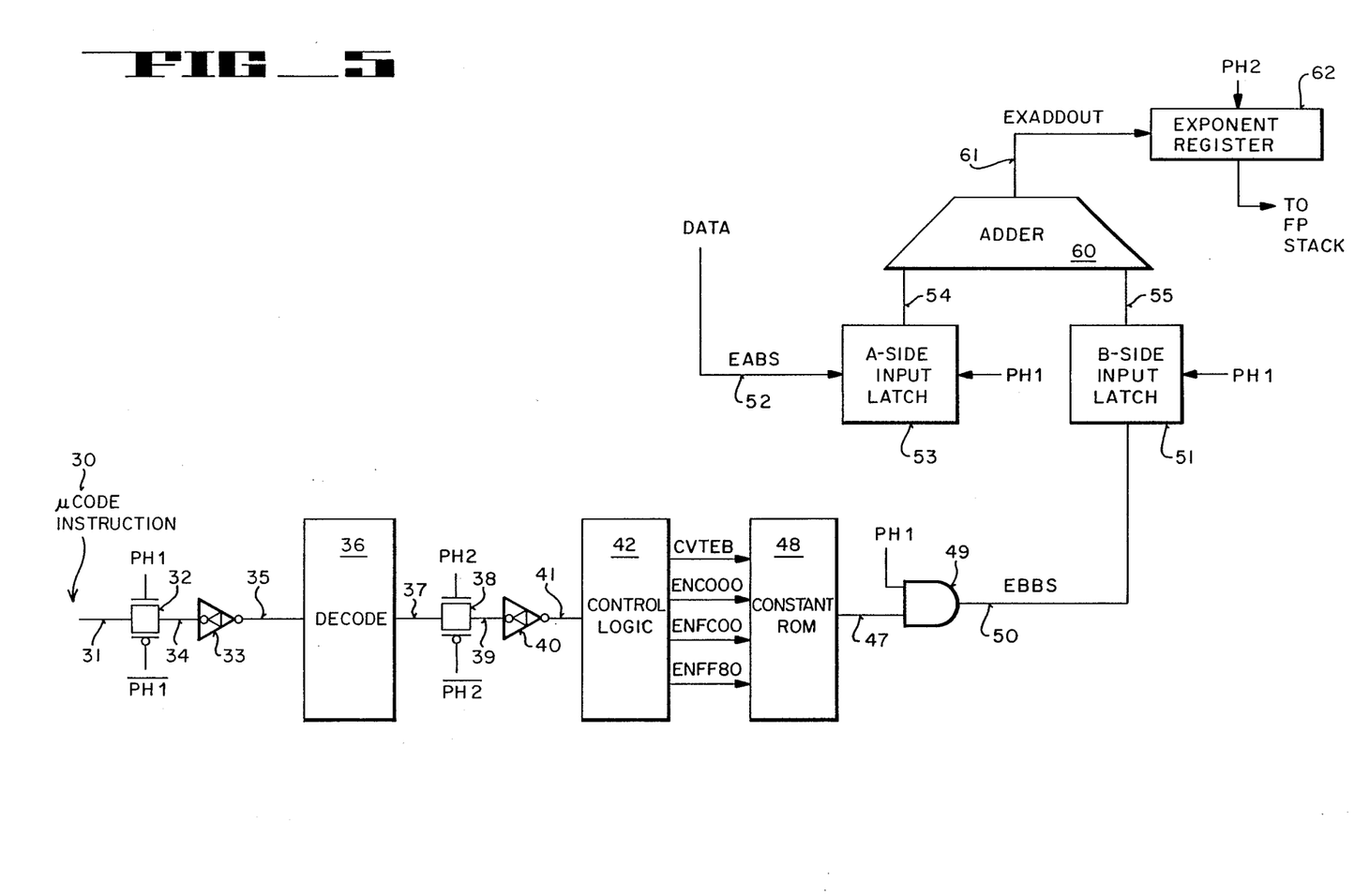
FIG. 5 is a block diagram of a preferred embodiment of the present invention.

Referring to FIG. 5, the currently preferred embodiment of the present invention can now be described in more detail. As the microprocessor steps through its instruction set, each microcode instruction is sampled by the conversion apparatus. A given microcode instruction 30 appears along line 31. Line 31 is connected to the input of a transmission gate 32 which is coupled to the first phase of a two-phase clocking system. Transmission gate 32 comprises an n-channel device connected to phase one of the clock PH1, and a p-channel device connected to $\overline{PH1}$. When PH1 is high (i.e., the first phase of the clock pulse is active) transmission gate 32 conducts and microcode instruction 30 is transferred onto line 34. Instruction 30 is then latched by latch 33 and held along line 35 which is connected to the input of decoder 36. Decoder 36 examines the microcode instruction to determine whether floating point data is to be loaded.

Figure 4:
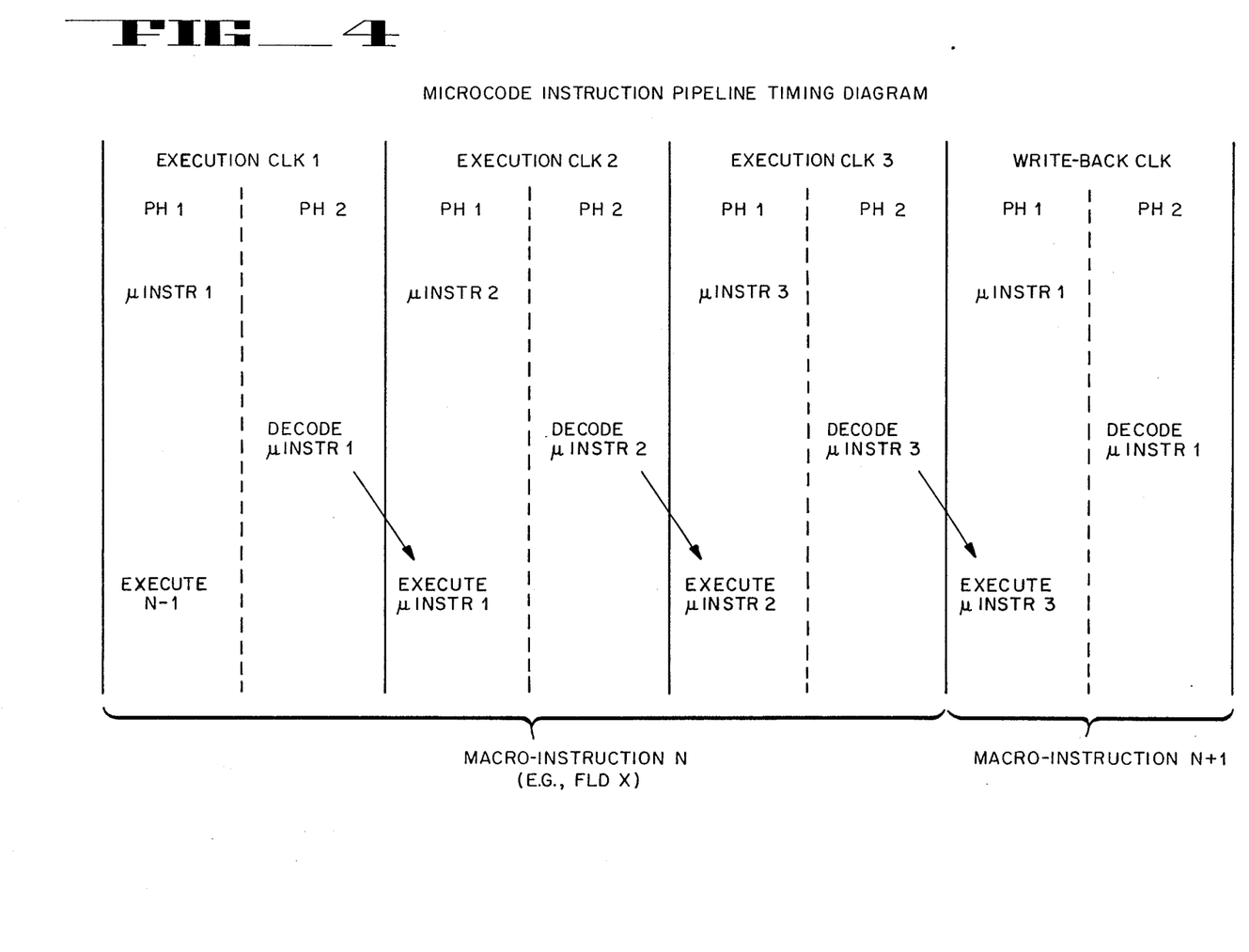
FIG. 4 is a timing diagram illustrating the timing relationship of each of the conversion events.

In a preferred embodiment of the present invention, the microcode instructions within the microprocessor are pipelined. Referring to the timing diagram of FIG. 4, a given microcode instruction arrives during the first phase (PH1) of a clocking cycle, is decoded during the second phase (PH2), and is executed in hardware synchronous with PH1 of the following clock. Hardware, therefore, is forever executing microcode instructions received and decoded during the previous clock. For purposes of illustration, assume that the macro-instruction "FLD $\chi$" is given, indicating that floating point number $\chi$ is to be loaded into the Funit. This macro-instruction normally comprises three separate microcode instructions. The first instruction (designated as $\mu_{instr1}$ in FIG. 4) directs cache data to be read into the Funit interface latch. Next, $\mu_{instr2}$ directs the floating point data to the exponent register—the conversion to internal format taking place in the process—and, finally, $\mu_{instr3}$ directs the converted exponent to be written into the floating point stack.

With reference to FIG. 5, when a floating point operation is detected, decoder 36 outputs a signal on line 37, alerting the conversion unit to commence a conversion of floating point number $\chi$. The format of number $\chi$ has previously been defined by the programmer or user to be either a single, double, or extended precision real number. Line 37 is coupled to transmission gate 38 which has inputs PH2 and $\overline{PH2}$, representing the connection to a second phase clock pulse. In a two-phase clocking system, when the first phase is high, the second phase is low, and vis-a-versa. Therefore, when phase two is high (or active), phase one is low (or inactive). When phase two is high, the decode instruction present on line 37 is transmitted across line 39. Line 39 is coupled to a latch 40 which transfers the information present across line 39 to line 41. Line 41 is coupled to the input of control logic device 42. The signal produced by decoder 36 instructs control logic device 42 to enable the particular constant from ROM 48 corresponding to the type of conversion that is to be performed.

As an example, if the user has requested a floating point load of variable $\chi$, and $\chi$ is a double precision real number, then control logic means 42 will send the appropriate signal to constant ROM 48 enabling hexidecimal constant FC00. This is shown in FIG. 5 by signal ENFC00, connected from control logic 42 to constant ROM 48. FC00 is equivalent to $\Delta_2$ and designates a conversion from double precision real to internal format. Analogoulsy, a conversion from single-to-internal is evoked along signal line ENFF80; from extended-to-internal, along line ENC000; and a from internal-to-extended real format along line CVTEB (denoting "convert to external bias"). Each one of these signal lines connecting control logic means 42 to constant ROM 48 produces a different constant corresponding to the type of conversion which is to be performed. The selected constant appears on line 47 which is coupled to the input of AND gate 49. The other input of AND gate 49 is clocked by PH1 so that the constant appears on bus 50, labelled EBBS, (standing for "Exponent B-side bus") synchronous with the arrival of the next clock.

During the first phase of the second clock pulse, the exponent data arrives on bus 52, labelled EABS ("Exponent A-side bus") and is loaded into A-side input latch 53. Also during phase one, the selected constant from constant ROM 48 is loaded into B-side latch 51 across EBBS bus 50. (Both EABS and EBBS are dynamic buses which move data only while PH1 is high; pre-charging occurs on these buses during phase-two). A-side input latch 53 and B-side input latch 51 are both coupled to adder 60 along lines 54 and 55, respectively.

Adder 60 performs the addition of the constant and the exponent portion of the floating point number during PH2 of the second clock pulse. The result is produced along line 61, labelled EXADDOUT in FIG. 5, which is coupled to exponent register 62. The result is finally loaded into register 62 during the second phase of the second clock pulse. This result is sourced onto the EABS bus in the next phase one and is written to the floating point stack for further operations.

Because of the pipeline sequencing of the microcode instructions, format conversion can be done by the present invention during PH2 of clock 2. In this way, exponent data rriving at PH1 of clock 2 on EABS can be converted and then sent to the floating point stack (FP stack) along EABS in PH1 of clock 3. Since the conversion does not require 2 extra clock pulses, as in the case of the prior art nanosequencer, the conversion is said to be "transparent," or to occur "on the fly."

It should be understood, of course, that the foregoing disclosure relates only to the preferred embodiment of the present invention and that numerous modifications may be made without departing from the spirit and scope of the present invention.

What is claimed is:

1. In a computer system which includes a two-phase clocking means, a data format conversion apparatus for converting floating point data formats comprising:
   decoding means for decoding an instruction in response to a first phase of a first clock pulse to begin the conversion of a floating point number having a first kind of format and for providing signal when said instruction is received;
   constant generating means for providing a certain constant prior to the end of a second phase of said first clock pulse in response to said first signal;
   latching means or latching said floating point number in aid first kind of format and said certain constant; and
   adder means for adding said certain constant to said floating point number of said first kind of format to produce a result which is said floating point number in a second kind of format.

2. The apparatus of claim 1 further comprising a register means for receiving and storing said result in response to a second phase of a second clock pulse.

3. A computer system including a CPU, a two-phase clocking means providing a first phase and a second phase clock signal, a floating point unit capable of performing floating point arithmetic operations, and a floating point data conversion apparatus for converting the exponent portion of a biased floating point number having a first format to a second format, said conversion apparatus comprising:
   decoding means for receiving and decoding a microcode instruction, said decoding means providing a first signal in response to a certain microcode instruction which indicates that a conversion is to be performed;
   a first transmission means for coupling said microcode instruction to said decoding means in response to a first phase of a first clock pulse;
   control means for receiving said first signal and for producing a second signal in response to said first signal;
   memory means for storing a plurality of constants and for producing a certain constant from one of said plurality of constants in response to said second signal;
   a second transmission means for coupling said first signal to said control means in response to a second phase of said first clock signal, said certain constant being produced by said memory means prior to the end of said second phase;
   adder means for adding said exponent portion of said floating point number in said first format to said certain constant, said adder means producing a result which represents said exponent portion of said floating point number in said second format.

4. The computer system of claim 3 wherein said apparatus further comprisres a register means for receiving and storing said result in response to a second phase of said second clock pulse.

5. The computer system of claim 4 wherein said memory means comprises a read-only memory.

6. The computer system of claim 5 wherein said floating point number in said first format comprises either a single precision real, double precision real, or an extended precision real floating point number.

7. In a computer system which includes a two-phase clocking means and a floating point unit, a method of converting the exponent portion of a biased floating point number from a first format to a second format comprising the steps of:
   decoding a microcode instruction calling for the conversion of said number from said first format to said second format in response to a first phase of a first clock pulse;
   selecting a certain constant from a read-only memory prior to the end of said second phase of said first clock pulse;
   adding said certain constant and said floating point number in said first format to obtain a result which is said exponent of said floating point number in said second format;
   storing said result in an exponent register in response to a second phase of a second clock pulse.

8. The method of claim 7 further including the step of latching said certain constant and said floating point number in said first format prior to said adding step.

9. In a microprocessor, a method of converting a biased floating point number of a first kind having a fixed length exponent of a first length, to biased floating point number of a second kind having a fixed length exponent of a second length, said method comprising the steps of:
   coupling a microcode instruction to a decoder in response to a first clock pulse;
   decoding said microcode instruction to provide a first signal in response t a first phase of a first clock pulse;
   coupling said first signal to a controller in response to a second phase of said first clock pulse, said controller producing a second signal in response to said first signal which selects a predetermined constant from a read-only memory, said predetermined constant being selected prior to the end of said second phase of said first clock pulse;
   latching said exponent of said first length and said predetermined constant in response to a first phase of a second clock pulse;
   adding said predetermined constant, representative of the difference between said first length and said second length, to said exponent of said first kind to obtain a result which is said exponent of said second length;
   storng said result in a register in response to a second phase of said second clock pulse.

10. The method of claim 9 wherein said first length is 8-bits long, said predetermined constant is the hexidecimal number FF80 and said second length is 17-bits long.

11. The method of claim 9 wherein said first length is 11-bits long, said predetermined constant is the hexidecimal number FC00 and said second lengths is 17-bits long.

12. The method of claim 9 wherein said first length is 15-bits long, said predetermined constant is the hexidecimal number C000, and said second length is 17-bits long.

13. The method of claim 9 wherein said first length is 17-bits long, said predetermined constant is the hexidecimal number 14000 and said second length is 15-bits long.

* * * * *

UNITED STATES PATENT AND TRADEMARK OFFICE
CERTIFICATE OF CORRECTION

PATENT NO.   : 4,949,291
DATED        : August 14, 1990
INVENTOR(S)  : Avtar Saini It is certified that error appears in the above-indentified patent and that said Letters Patent is hereby corrected as shown below:

Column 5, line 22   delete "FFF"   Insert   -- FFFF--

Column 7, line 6    delete "rriving"   Insert   --arriving--

Column 8, line 44   delete After the word "response" delete "t" insert --to--

Signed and Sealed this

Twelfth Day of July, 1994

Attest:

BRUCE LEHMAN

Attesting Officer

Commissioner of Patents and Trademarks